(12) United States Patent
Zhang et al.

(10) Patent No.: US 8,506,680 B2
(45) Date of Patent: *Aug. 13, 2013

(54) RECLAMATION OF GASEOUS SUBSTANCES FROM BOILER FLUE GAS FOR OIL RECOVERY

(75) Inventors: Fengshan Zhang, Panjin (CN); Yuanwen Gao, Panjin (CN)

(73) Assignee: Liaohe Petroleum Exploration Bureau, CNPC, Panjin, Liaoning Province (CN)

( * ) Notice: Subject to any disclaimer, the term of this patent is extended or adjusted under 35 U.S.C. 154(b) by 878 days.

This patent is subject to a terminal disclaimer.

(21) Appl. No.: 11/940,264

(22) Filed: Nov. 14, 2007

(65) Prior Publication Data

US 2008/0236114 A1    Oct. 2, 2008

(30) Foreign Application Priority Data

Mar. 30, 2007   (CN) .................... 2007 2 0011441 U

(51) Int. Cl.
  *E21B 43/18*   (2006.01)
  *B01D 53/04*   (2006.01)
(52) U.S. Cl.
  USPC ........ 95/94; 95/236; 96/121; 96/361; 96/365; 96/132; 166/266; 166/267; 166/90.1; 166/402
(58) Field of Classification Search
  USPC ................. 55/385.1; 95/160, 166, 169, 172, 95/177, 199, 236, 92, 94; 96/234, 121, 134, 96/361, 365, 132; 423/226, 228, 229; 466/266, 466/267, 90.1, 402; 62/617
  See application file for complete search history.

(56) References Cited

U.S. PATENT DOCUMENTS

| | | | | |
|---|---|---|---|---|
| 3,929,434 A | * | 12/1975 | Nelson | 95/236 |
| 4,203,958 A | * | 5/1980 | Snarski | 423/351 |
| 4,353,713 A | * | 10/1982 | Cheng | 48/202 |
| 4,546,829 A | * | 10/1985 | Martin et al. | 166/267 |
| 4,799,551 A | * | 1/1989 | Bauer et al. | 166/402 |
| 5,122,355 A | * | 6/1992 | Prasad et al. | 423/351 |
| 5,339,633 A | * | 8/1994 | Fujii et al. | 60/648 |
| 6,767,386 B2 | * | 7/2004 | Kawai et al. | 95/98 |
| 7,341,102 B2 | * | 3/2008 | Kresnyak et al. | 166/267 |
| 7,588,612 B2 | * | 9/2009 | Marwitz et al. | 55/356 |
| 2005/0087340 A1 | * | 4/2005 | Zupanick et al. | 166/245 |
| 2007/0256559 A1 | * | 11/2007 | Chen et al. | 95/169 |
| 2008/0236398 A1 | | 10/2008 | Zhang | |
| 2009/0148930 A1 | * | 6/2009 | Gal et al. | 435/264 |

* cited by examiner

*Primary Examiner* — Frank Lawrence, Jr.
(74) *Attorney, Agent, or Firm* — Mintz Levin Cohn Ferris Glovsky and Popeo, P.C.

(57) ABSTRACT

Systems and techniques for the reclamation from boiler flue gas of all or substantially all gaseous substances for well injection oil recovery. A system can include one or more of a boiler for generating high pressure steam, a high pressure water pump, a tower scrubber, an induced draft fan, an absorber, a separating tank, a heat exchanger, a regenerator, a reboiler, a steam boiler, a water segregator, a carbon dioxide compressor, a purifier, a nitrogen compressor, drying beds, adsorption beds, a carbon dioxide pressurizer, a nitrogen pressurizer and a mixing tank of which: the boiler for generating high pressure steam, the tower scrubber, the absorber, the regenerator and the adsorption beds connect with each other in turn. In addition, the mixing tank connects by pipelines with a gas injection tube of an oil well. Mixed gases of carbon dioxide and nitrogen can be obtained for injection into the oil well, thus gaining favorable results of crude oil output increase as well as environment protection.

13 Claims, 1 Drawing Sheet

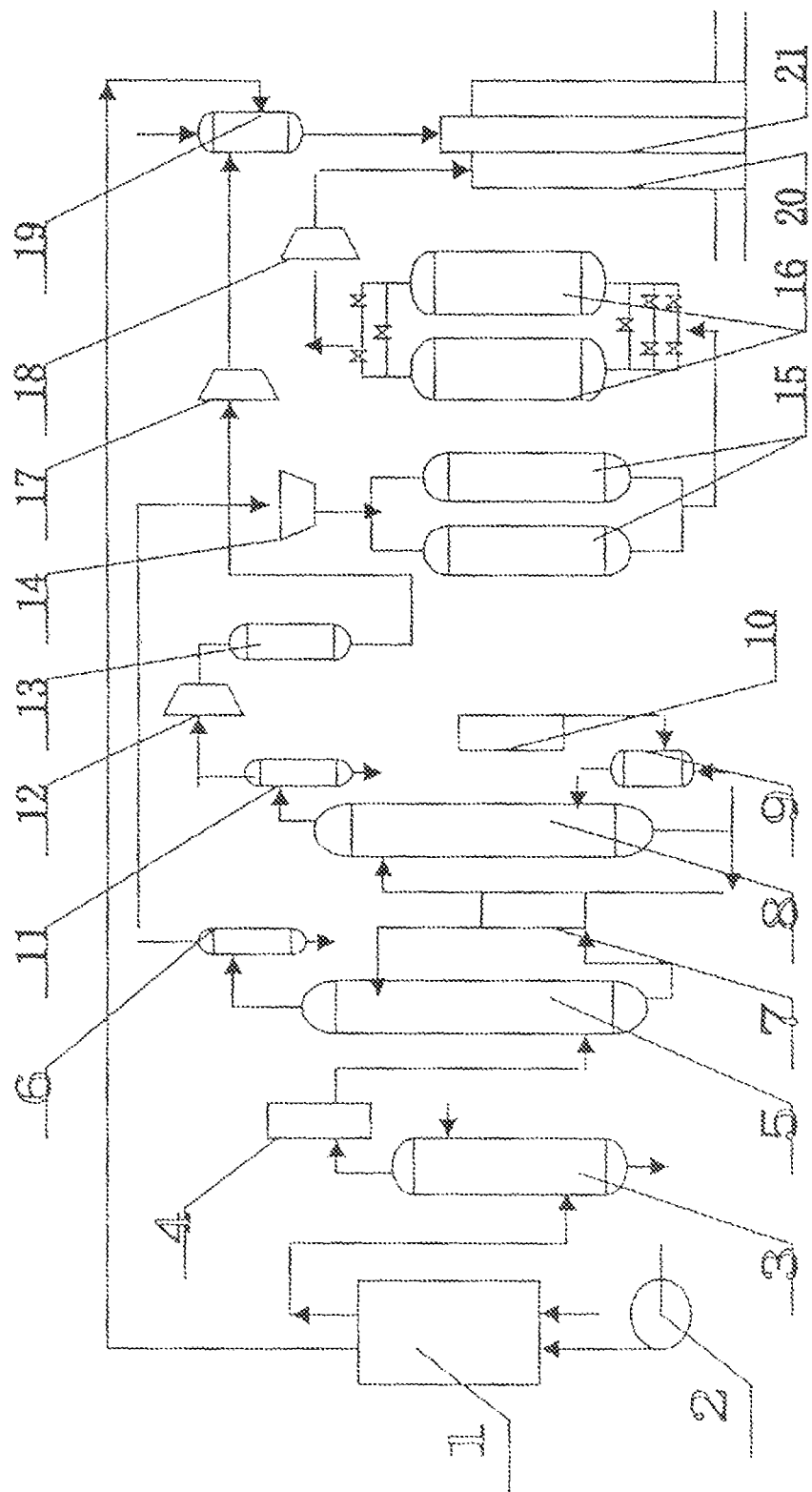

RECLAMATION OF GASEOUS SUBSTANCES FROM BOILER FLUE GAS FOR OIL RECOVERY

CROSS REFERENCE

The present patent application claims priority under 35 U.S.C. §119 to Chinese Patent Application Serial No. 200720011441.7 filed on Mar. 30, 2007, and entitled, "Equipment for Reclaim of All Gaseous Substances from Boiler Flue Gas for Oil Recovery" the entire disclosure of which is incorporated by reference herein.

FIELD

The subject matter described herein involves a comprehensive mate equipment for thick crude oil (or called "dense" crude oil) recovery, especially one for separation as well as purification of boiler flue gas and reclamation of gaseous substances from boiler flue gas for injection into wells.

BACKGROUND

In oil fields, the reservoir bed belonging to the continental facies bears considerable heterogeneity during the process of sedimentation. Part of the crude oil containing water has fast rising velocity for its high viscosity. In addition, the exploitation of many oil fields has entered into the middle or later period: though a series of measures such as water or steam injection have been taken, the recovery efficiency of crude oil is still low, the exploitation cost is high, and a lot of original oil in-place is difficult to or even cannot be exploited economically. Worse still, the recovery efficiency is even lower while the cost is even higher with regard to low permeable oil, thick crude oil as well as crude oil of condensate gas reservoirs.

Natural gas injection into the oil field can be used for oil recovery. Fairly favorable results can be obtained for the following reason: natural gas possesses some properties of crude oil in oil reservoirs and would not cause any harm to the oil bed; consequently, miscibility can be obtained under relatively low pressures or in the process of flooding. However, the technology is, to a certain extent, restricted by economic factors for the rising price of gas hydrate (including natural gas), which, as a result, motivates the studies on the injection of other gases, especially carbon dioxide and nitrogen.

Oil recovery efficiency can be increased by flooding carbon dioxide and/or nitrogen into the oil fields on the basis of traditional steam injection. Having high solubility in both water and oil, carbon dioxide, when solved into crude oil in huge amount, can expand the volume as well as decrease the viscosity of the crude oil. During the process of miscible flooding, carbon dioxide extracts and gasifies the light components contained in the crude oil, and in this way the interfacial tension is reduced and flooding is carried out. Meanwhile, carbon dioxide functions to improve mobility ratio, extract and gasify light hydrocarbons in crude oil as well as increasing, by molecular diffusion, the permeability of oil reservoirs, etc.

Flue gas of combustors such as boilers etc. consists of carbon dioxide and nitrogen, two key and economical gases for oil recovery by gas injection. With coal, gas or oil as the fuel, combustors including boilers used in oil fields usually produce flue gas containing 9%~15% carbon dioxide (by volume), 0%~85% nitrogen (by volume) and slight quantity of oxygen, sulfur dioxide and water.

Reclamation of carbon dioxide from flue gas of coal, gas or oil boilers may protect the environment and realize environment-friendly production. As the dominating component of greenhouse gases, carbon dioxide exerts non-negligible negative influence on the global ecological system, on the economic development as well as on the health and life quality of human beings. A critical point for minimizing the greenhouse effect is to restrict the content of carbon dioxide in the atmosphere. Therefore, reclamation of carbon dioxide has tremendous significance, considered from the viewpoint of tackling the greenhouse effect problem. Therefore, it is of great significance to reclaim carbon dioxide from flue gas of combustor so as to apply it in gas injection oil producing technology, which may not only increase the crude oil output but also reduce pollution to the environment.

Nitrogen has low solubility in water and the similar viscosity as methane for its larger compressibility and formation volume factor than other gases. As an inert gas, it has no toxicity or corrosivity or flammability; mixture of nitrogen with most of fluids always presents in the phase of cystose, which may have certain lifting influence on the fluids. The above properties enables nitrogen to improve the recovery efficiency of oil by various flooding modes such as immiscible flooding, miscible flooding, gravity flooding, combination flooding and water-gas alternating flooding, etc.

Thermal recovery has dominated the exploitation mode of some thick crude oilthick crude oil blocks in some oil fields. Take wet steam generator (23 ton thermal recovery boiler) for example: with natural gas as the fuel, each boiler discharges approximately 480 million $Nm^3$ of flue gas per year, which, if used as the proximal gas resource of carbon dioxide and nitrogen, may drastically lower the oil recovery cost and provide optimal resources for oil recovery by flue gas injection.

Gas injection into the oil well is an important technology for improving the oil recovery efficiency by reducing interfacial tension, lowering the viscosity of crude oil and restoring or maintaining the reservoir pressure when gases and crude oil form into immiscible or miscible phase for different gases and under different reservoir conditions.

The primary components of flue gas of steam-injection boilers, in the process of thermal recovery of thick crude oil by steam injection, are carbon dioxide and nitrogen. As is presented by studies, combination of steam boilers and mate flue gas reclamation equipment may realize the selective injection of steam, carbon dioxide, nitrogen or their mixture, which not only acquires satisfactory results of outcome increase but also is conducive to the environment protection.

SUMMARY

Systems and techniques are provided for the reclamation and purification of all or substantially all gaseous substances from boiler flue gas as well as for injection of such gaseous substances into oil wells coupled with steam for thick crude oil recovery.

In one aspect, an apparatus for the reclamation from boiler flue gas of all gaseous substances for well injection oil recovery is provided. The apparatus can comprises one or more of a boiler for generating high pressure steam, a high pressure water pump, a tower scrubber, an induced draft fan, an absorber, a heat exchanger, a regenerator, a reboiler, a steam boiler and a mixing tank.

The flue gas outlet at the top of the boiler can connect with the tower scrubber by pipelines. The steam outlet at the top of the boiler can connect with the mixing tank. The tower scrubber can connect with the absorber by pipelines; the absorber can connect with the heat exchanger by pipelines. The regenerator can connect respectively with the heat exchanger, the reboiler and the water segregator by pipelines. The reboiler can connect with the steam boiler. The water segregator can connect with the mixing tank by pipelines. The mixing tank can connect by pipelines with a gas injection tube of the oil field.

In a further aspect, an apparatus for the reclamation from boiler flue gas of all gaseous substances for well injection oil recovery is provided. Such an apparatus can comprise one or more of a boiler for generating high pressure steam, a high pressure water pump, a tower scrubber, an induced draft fan, an absorber, a separating tank, a heat exchanger, a regenerator, a reboiler, a steam boiler, a water segregator, a carbon dioxide compressor, a purifier, a nitrogen compressor, drying beds, adsorption beds, a carbon dioxide pressurizer, a nitrogen pressurizer and a mixing tank.

The boiler can connect with the high pressure water pump by pipelines. The flue gas outlet at the top of the boiler can connect with the tower scrubber by pipelines. The steam outlet at the top of the boiler can connect with the mixing tank; the tower scrubber can connect with the absorber by pipelines interposing with the induced draft fan. The absorber can connect respectively with the heat exchanger and the separating tank by pipelines; the regenerator can connect respectively with the heat exchanger, the reboiler and the water segregator by pipelines. The reboiler can connect with the steam boiler. The water segregator can connect with the purifier by pipelines interposing with the carbon dioxide compressor. The purifier can connect with the mixing tank by pipelines interposing with the carbon dioxide pressurizer. The nitrogen compressor can connect with the drying beds by pipelines. The drying beds can connect with the adsorption beds by pipelines. The adsorption beds can connect with a well casing by pipelines interposing with the nitrogen pressurizer. The mixing tank can connect by pipelines with a gas injection tube of the oil field.

The adsorption liquid utilized by the absorber may, for example, be a mixed liquid of one or more solvents selected from the group consisting of polyethylene glycol dimethyl ether, trimethylether, tetramethylene sulfone, propylene carbonate and low temperature methanol, or may be a mixed liquid of one or more solvents selected from the group consisting of monoethanolamine, methyldiethanolamine, oxidation inhibitor and corrosion inhibitor.

When the boiler is running, the produced steam may be directly injected into the well; and the flue gas, after scrubbed by tower scrubber; absorbed by absorber and regenerated by regenerator, may produce 98% carbon dioxide gas. The end gas, after compressed, dried and absorbed, may produce 96% nitrogen. The steam, carbon dioxide gas and nitrogen obtained step by step from the boiler may be injected into the well after pressurized and regulated, thereby achieving the object of increasing the crude oil output and protecting the environment.

The comprehensive mate equipment, when producing steam by the boiler, can obtain mixed gases of carbon dioxide and nitrogen for injection into the well, thus gaining favorable results of crude oil output increase as well as environment protection.

DESCRIPTION OF THE ACCOMPANYING FIGURE

FIG. 1 is a structural diagram of overall process flow of the subject matter described herein. Marks "20" and "21" refer respectively to well casing and gas injection tube for oil recovery.

DETAILED DESCRIPTION

As is illustrated in FIG. 1, equipment for the reclamation from boiler flue gas of all gaseous substances for well injection oil recovery can comprises one or more of a boiler 1 for generating high pressure steam, a high pressure water pump 2, a tower scrubber 3, an induced draft fan 4, an absorber 5, a separating tank 6, a heat exchanger 7, a regenerator 8, a reboiler 9, a steam boiler 10, a water segregator 11, a carbon dioxide compressor 12, a purifier 13, a nitrogen compressor 14, drying beds 15, adsorption beds 16, a carbon dioxide pressurizer 17, a nitrogen pressurizer 18 and a mixing tank 19.

The structure, assembly and installment of the equipment for the reclamation from boiler flue gas of all gaseous substances for well injection oil recovery are described below.

The boiler 1 can connect with the high pressure water pump 2 by pipelines. The steam outlet at the top of the boiler 1 can connect with the mixing tank 19 by pipelines. The flue gas outlet at the top of the boiler 1 can connect with the tower scrubber 3. The tower scrubber 3 can connect with the absorber 5 by pipelines interposing with the induced draft fan 4. The absorber 5 can connect respectively with the separating tank 6 and the heat exchanger 7 by pipelines.

The boiler 1 can be used for producing high pressure steam.

As to boiler 1, the inner tubes therein may be high pressure channels able to produce pressure of over 15 MPa; the fuel may be coal, crude oil or flammable gases; purified water for production is provided by the high pressure pump 2 with pressure of over 15 MPa.

The tower scrubber 3 can be used for the removal of sulfur dioxides and dusts in the flue gas.

The tower scrubber 3 can be a packing tower. The packing material may be made of metals, plastics or ceramics as well as of charcoal, minerals or vegetable silk. The eluant may be water, alkalescent solution such as natrium carbonicum solution or ammonia water etc. as well as sulfite solution.

The flue gas can be washed in the tower scrubber 3 to remove the contained sulfur dioxide and solid particles and then the flue gas can enter into the absorber 5.

The absorber 5 and the regenerator 8 can compose the carbon dioxide reclaim system. The carbon dioxide adsorption liquid can be introduced into the carbon dioxide absorber 5 from the top down. The adsorption liquid cam be used for absorbing the carbon dioxide contained in the boiler flue gas. The regenerator 8 can be used for regenerating the adsorption capability of the adsorption liquid.

The absorber 5 and the regenerator 8 can both be packing towers, in which the packing material may be made of metals, plastics or ceramics.

The adsorption liquid in the absorber 5 may be carbon dioxide absorbents such as, for example, a mixed liquid of one or more solvents selected from the group consisting of polyethylene glycol dimethyl ether, trimethylether, tetramethylene sulfone, propylene carbonate and low temperature methanol, or a mixed liquid of one or more solvents selected from the group consisting of monoethanolamine, methyldiethanolamine, oxidation inhibitor and corrosion inhibitor.

In the equipment, an induced draft fan 4 can be equipped between tower scrubber 3 and absorber 5 to provide power for the flow of flue gas in the upper part of the equipment in accordance with the present subject matter described herein. The induced draft fan 4 may be any type of blower suitable for the transmission of gases in pipelines.

Adsorption liquid flowing out from the inferior part of absorber 5 is rich in carbon dioxide and for this reason is called "rich liquid". The rich liquid is pumped into the heat exchanger 7 through pipelines.

The heat exchanger 7 can connect with the regenerator 8 by pipelines. The rich liquid, which is heated through heat exchange in the heat exchanger 7, is pumped through pipelines into the regenerator 8 from the top of it.

Inside the regenerator 8, the rich liquid flows through the packing layer from the top down and is heated by the steam entering into the regenerator 8 from the bottom up and in this way, the carbon dioxide in the rich liquid is released (the adsorption of carbon dioxide is removed) and emitted from the top of the regenerator 8.

The steam boiler 10 can connect with the reboiler 9 by pipelines. The reboiler 9 can connect with the regenerator 8 by pipelines.

The reboiler 9 can be a shell and tube heat exchanger. Solution coming from the bottom of the regenerator 8 in which the carbon dioxide has not been completely released enters into the tubes of the reboiler 9 into which steam from the steam boiler 10 is introduced. So, the solution containing carbon dioxide is heated in the reboiler 9 and the carbon dioxide is released out and leaves from the top of the boiler 9 into the regenerator 8 and then is emitted out into the separating tank 11.

On the other hand, high temperature solution basically free of carbon dioxide (also referred to as "lean liquid") leaves from the top of the reboiler 9 and enters into the heat exchanger 7 through pipelines and exchanges heat with the said low temperature solution rich in carbon dioxide coming from the outlet at the inferior part of the absorber 5 ("rich liquid"), and then enters into the absorber 5 from the top and continues to be adsorption liquid for absorbing carbon dioxide in the flue gas.

The regenerator 8 can connect with the water segregator 11 by pipelines. The desorbed carbon dioxide gas enters into the water segregator 11 from the regenerator 8 through pipelines.

The water segregator 11 is used for the separation and removal of the slight quantity of liquid water contained in the carbon dioxide gas coming from the regenerator 8.

The water segregator 11 can connect with the purifier 13 by pipelines. The Carbon dioxide compressor 12 is equipped between the water segregator 11 and the purifier 13. Gas coming from the water segregator 11 passes through the carbon dioxide compressor 12 and reaches the purifier 13, where the accompanied gaseous water is eliminated.

The liquid carbon dioxide with high purity coming from the purifier 13 is sent through pipelines to the carbon dioxide pressurizer 17, and after pressurized, to the mixing tank 19, where it is mixed with pressurized nitrogen and/or pressurized steam for injection into the oil well.

Described above is the flow of reclamation of carbon dioxide from boiler flue gas. Described below is the flow of reclamation of nitrogen from boiler flue gas.

Because of the absorbing effect of the absorber 5, the gas coming out from the top of the absorber 5 basically contains no carbon dioxide. It is mostly nitrogen accompanied by slight quantity of oxygen and slimsy liquid and gas water. Such gas coming out from the top of the absorber 5 enters into the separating tank 6 through channels.

The separating tank 6 can be used for the removal of the liquid water contained in the gas coming out from the top of the absorber 5. The liquid water can be discharged from the outlet at the bottom of the separating tank 6.

After the liquid water is removed, the gas coming out from the top of the separating tank 6 mainly contains huge amount of nitrogen, slight amount of oxygen and slimsy gas water.

The separating tank 6 can connect with the nitrogen compressor 14, which compresses the gas free from liquid water and increases its pressure.

The drying beds 15 can connect respectively with the nitrogen compressor 14 and the adsorption beds 16. The pressurized gas coming out from the compressor 14 can enter into the drying beds 15 through pipelines. Filled with solid particle packing materials such as aluminium oxide, silica gel or molecular sieve, the drying beds 15 can be composed by connection of two drying-bed spigot groups of the same volume and pipelines. Water is further eliminated out of the gas in the drying beds 15.

Gas coming out from the drying beds 15 can enter through pipelines into the adsorption beds 16, where the slight amount of oxygen is removed.

The adsorption beds 16 can be composed of two adsorption beds of the same volume in which solid particle packing materials are filled including aluminium oxide and carbon molecular sieve. The two adsorption beds can be connected with spigot groups and pipelines, and may be automatically operated by controlling spigots with PLC (Programmable Logical Controller).

Nitrogen of high purity is obtained after the oxygen is removed when the gas passes through adsorption beds.

The adsorption beds 16 can connect with the well casing 20 interposing with the nitrogen pressurizer 18. The high purity nitrogen coming from the adsorption beds 16 can be pressurized when passing through the nitrogen pressurizer 18 and then injected into gas injection tube for oil recovery.

The mixing tank 19 can connect with the gas injection tube for oil recovery 21 by pipelines. With the mixing tank 19, the reclaimed carbon dioxide and nitrogen from flue gas and the high pressure steam produced from boiler 1 may be matched and mixed at various proportions for injection into the gas injection tube for oil recovery 21 for the exploitation of thick crude oil.

As is stated above, the equipment for the reclamation of all gaseous substances from boiler flue gas as well as for the injection of them into the well for oil recovery is able to efficiently reclaim the carbon dioxide and nitrogen from the flue gas of steam boiler producing steam for well injection. The reclaimed carbon dioxide and nitrogen may be injected into the well for thick crude oil recovery coupled with the steam generated by the boiler. The equipment fully utilizes the exhaust gas produced by the steam boiler for thick crude oil recovery and thereby greatly reduces the cost of thick crude oil recovery.

With the equipment, carbon dioxide, nitrogen and high pressure steam may be injected together with various combinations and at different proportions. In this way, technologies for thick crude oil recovery are enriched, enabling oil recovery arts diverse enough for more practical conditions and considerably increasing the exploitation efficiency of thick crude oil wells.

It can also be seen that, the flue gas and the harmful substances contained in it are basically cleaned up after treatment by the method of the subject matter described herein, and thus pollution to the environment is consumedly decreased with the method.

For these reasons, the subject matter described herein may greatly lower the cost as well as increase the efficiency of thick crude oil well exploitation and at the same time reduce obviously the pollution to the environment.

Although a few variations have been described in detail above, other modifications are possible. For example, the process flow depicted in the accompanying FIGURE and described herein do not require the particular order shown, or sequential order, to achieve desirable results. Moreover, different sub-components may be utilized in order to achieve desirable results. Other embodiments may be within the scope of the following claims.

What is claimed is:

1. An apparatus for the reclamation from boiler flue gas of all gaseous substances for well injection oil recovery comprising:
   a boiler for generating high pressure steam having a flue gas outlet and a steam outlet;
   a tower scrubber coupled to the flue gas outlet of the boiler;
   a carbon dioxide reclaim system configured to purify from the flue gases highly pure carbon dioxide gas, the reclaim system comprising:
      an absorber coupled to the tower scrubber;
      a heat exchanger coupled to the absorber; and
      a regenerator coupled to the heat exchanger and coupled to a reboiler;
   a water segregator coupled to the regenerator;
   a steam boiler coupled to the reboiler;
   a purifier configured to liquefy and purify the carbon dioxide gas from the water segregator; and
   a mixing tank coupled to the steam outlet of the boiler and to the purifier, the mixing tank operable to connect to a gas injection tube of an oil field, wherein the mixing tank is configured to mix in the mixing tank the captured steam and high purity liquefied carbon dioxide gas into a proportion suitable for combined injection into the gas injection tube of the oil field for increased recovery of thick crude oil from the oil field.

2. The apparatus of claim 1, wherein the boiler is coupled to a high pressure water pump.

3. The apparatus of claim 1, wherein an induced draft fan is provided between tower scrubber and absorber.

4. The apparatus of claim 1, wherein the water segregator is provided between regenerator and mixing tank; the water segregator connects with the purifier by pipelines interposing with a carbon dioxide compressor; the purifier connects by pipelines with the mixing tank interposing with a carbon dioxide pressurizer.

5. The apparatus of claim 1, wherein the absorber is coupled to a separating tank.

6. The apparatus according to claim 5, wherein the separating tank is coupled to a nitrogen compressor; the nitrogen compressor is coupled to drying beds; the drying beds are coupled to adsorption beds; the adsorption beds connects with a well casing by pipelines interposing with a nitrogen pressurizer.

7. The apparatus of claim 1, wherein an absorption liquid adopted in the absorber is a mixed liquid of one or more solvents selected from a group consisting of: polyethylene glycol dimethyl ether, trimethylether, tetramethylene sulfone, propylene carbonate and low temperature methanol or is a mixed liquid of one or more solvents selected from the group consisting of monoethanolamine, methyldiethanolamine, oxidation inhibitor, and corrosion inhibitor.

8. An apparatus for the reclamation from boiler flue gas of gaseous substances for well injection oil recovery, comprising:
   a boiler for generating high pressure steam having a flue gas outlet and a steam outlet;
   a high pressure water pump coupled to the boiler;
   a tower scrubber coupled to the flue gas outlet of the boiler;
   a carbon dioxide reclaim system configured to purify from the flue gases highly pure carbon dioxide gas, the reclaim system comprising:
      an absorber coupled to the tower scrubber;
      an induced draft fan interposed between the tower scrubber and the absorber;
      a separating tank coupled to the absorber;
      a heat exchanger coupled to the absorber; and
      a regenerator coupled to the heat exchanger and coupled to a reboiler;
   a steam boiler coupled to the reboiler;
   a water segregator coupled to the regenerator;
   a purifier coupled to the water segregator, the purifier configured to liquefy and purify the carbon dioxide gas from the water segregator;
   a carbon dioxide compressor interposed between the water segregator and the purifier;
   a nitrogen compressor;
   drying beds coupled to the nitrogen compressor;
   absorption beds coupled to the drying beds, the absorption beds being operable to connect to a well casing;
   a nitrogen pressurizer interposed between the absorption beds and the well casing;
   a mixing tank coupled to the steam outlet of the boiler and to the purifier, the mixing tank operable to connect to a gas injection tube of an oil field, wherein the mixing tank is configured to mix in the mixing tank the captured steam and high purity liquefied carbon dioxide gas into a proportion suitable for combined injection into the gas injection tube of the oil field for increased recovery of thick crude oil from the oil field; and
   a carbon dioxide pressurizer interposed between the purifier and the mixing tank.

9. The apparatus of claim 8, wherein an absorption liquid adopted in the absorber is a mixed liquid of one or more solvents selected from a group consisting of: polyethylene glycol dimethyl ether, trimethylether, tetramethylene sulfone, propylene carbonate and low temperature methanol or is a mixed liquid of one or more solvents selected from the group consisting of monoethanolamine, methyldiethanolamine, oxidation inhibitor and corrosion inhibitor.

10. A method for recovery of thick crude oil from an oil well, comprising:
   generating high pressure steam and flue gases in a boiler from the combustion of a fuel source;
   capturing steam emitted from the combustion of the fuel source in a steam outlet in the boiler;
   capturing flue gases emitted from the combustion of the fuel source in a flue gas outlet in the boiler;
   removing sulfur dioxides and solid particles from the flue gases in a tower scrubber coupled to the flue gas outlet of the boiler;
   purifying carbon dioxide gas from the flue gases using a carbon dioxide reclaim system comprising an absorber coupled to the tower scrubber, a heat exchanger coupled to the absorber, and a regenerator coupled to the heat exchanger and to a reboiler;
   segregating and removing liquid water from the carbon dioxide gas from the regenerator;
   liquefying purified carbon dioxide gas from the carbon dioxide reclaim system using a purifier;
   mixing in a mixing tank the steam from the steam outlet of the boiler with the liquefied carbon dioxide gas from the purifier into a proportion adapted for combined injection into a gas injection tube of an oil well for recovering an amount of thick crude oil from the oil well;

injecting the proportion into the gas injection tube of the oil well; and recovering the amount of thick crude oil in the oil well.

11. The apparatus of claim 1, wherein the purifier is configured to send liquid carbon dioxide of high purity to a pressurizer, the pressurizer is configured to send liquid carbon dioxide to the mixing tank that is configured to mix the liquid carbon dioxide with pressurized nitrogen and/or pressurized steam for combined injection into the gas injection tube.

12. The apparatus of claim 8, wherein the nitrogen compressor is configured to send pressurized nitrogen to the mixing tank, wherein the mixing tank is further configured to mix liquid carbon dioxide with pressurized nitrogen and/or pressurized steam for combined injection into the gas injection tube.

13. The method of claim 10, further comprising segregating nitrogen of high purity from the flue gases, pressurizing the high purity nitrogen with a nitrogen pressurizer, and mixing pressurized nitrogen with the steam and the liquefied carbon dioxide gas in the mixing tank.

* * * * *